US006386375B1

(12) United States Patent
Olsen

(10) Patent No.: US 6,386,375 B1
(45) Date of Patent: May 14, 2002

(54) LUBRICATION SYSTEM FOR VIBRATING FLAT SCREENS

(75) Inventor: Lawrence Calvin Olsen, Springfield, OR (US)

(73) Assignee: Johnson Crushers International, Eugene, OR (US)

(*) Notice: Subject to any disclaimer, the term of this patent is extended or adjusted under 35 U.S.C. 154(b) by 0 days.

(21) Appl. No.: 09/758,333

(22) Filed: Jan. 10, 2001

(51) Int. Cl.[7] .......................... B07B 1/42; F16H 33/00

(52) U.S. Cl. .................... 209/366.5; 209/367; 209/326; 209/332; 74/61

(58) Field of Search ........................ 74/61, 87; 209/364, 209/365.1, 366, 366.5, 367, 325, 326, 331, 332, 320

(56) References Cited

U.S. PATENT DOCUMENTS

| | | | | | |
|---|---|---|---|---|---|
| 803,958 | A | * | 11/1905 | Adams | 74/61 |
| 1,779,923 | A | * | 10/1930 | Wagner | 74/61 |
| 2,766,629 | A | | 10/1956 | Booth | |
| 2,886,976 | A | * | 5/1959 | Dean | 74/61 |
| 3,097,537 | A | | 7/1963 | Peterson | |
| 3,442,381 | A | | 5/1969 | Johnson | |
| 3,896,677 | A | * | 7/1975 | Larson | 74/87 |
| RE30,932 | E | * | 5/1982 | Stone | 74/61 |
| 5,232,099 | A | | 8/1993 | Maynard | |
| 5,666,852 | A | | 9/1997 | Musschoot | |
| 5,816,412 | A | | 10/1998 | Bokor | |
| 6,070,737 | A | | 6/2000 | Russell | |
| 6,082,551 | A | | 7/2000 | Kai | |

* cited by examiner

*Primary Examiner*—Donald P. Walsh
*Assistant Examiner*—Joseph Rodriguez
(74) *Attorney, Agent, or Firm*—Robert L. Harrington

(57) ABSTRACT

A vibrating screen supported by springs and vibrated via rotating gear sets. The gears are provided with off center weights synchronized to produce angularly directed vibration for moving the material from end to end on the screen. The gears are lubricated with a bath of low viscosity lubricant which is vibrated to form lubricant spikes that extend into the path of the weights to be propelled by the weights into the gears. The weights are substantially crescent shaped at their leading end to avoid hammer like impact of the lubricant and to thereby reduce heat generation.

4 Claims, 3 Drawing Sheets

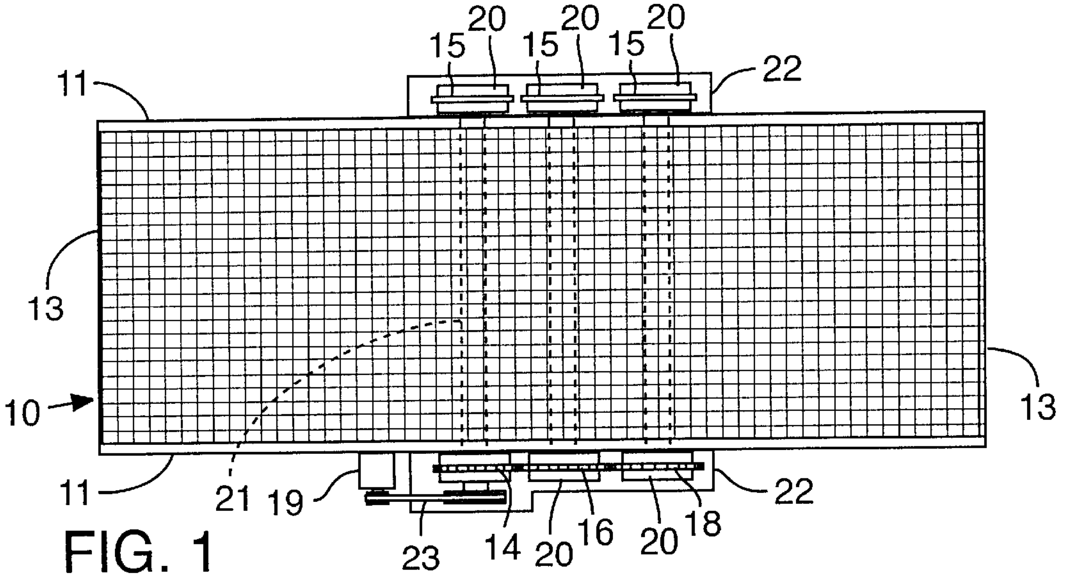
FIG. 1
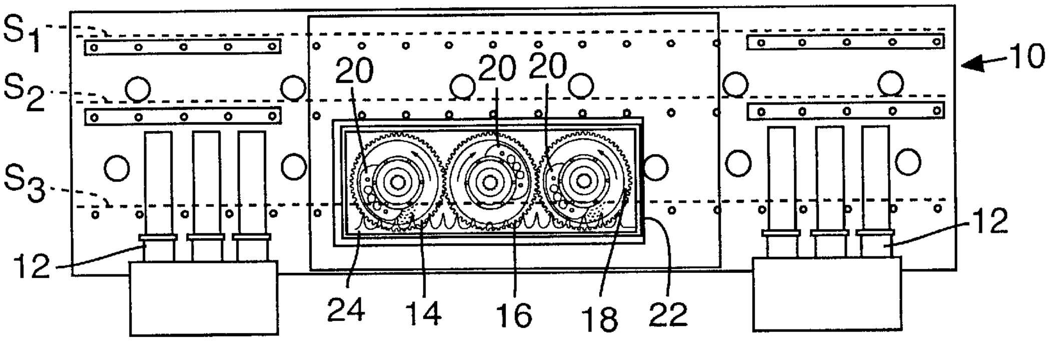
FIG. 2
FIG. 2A
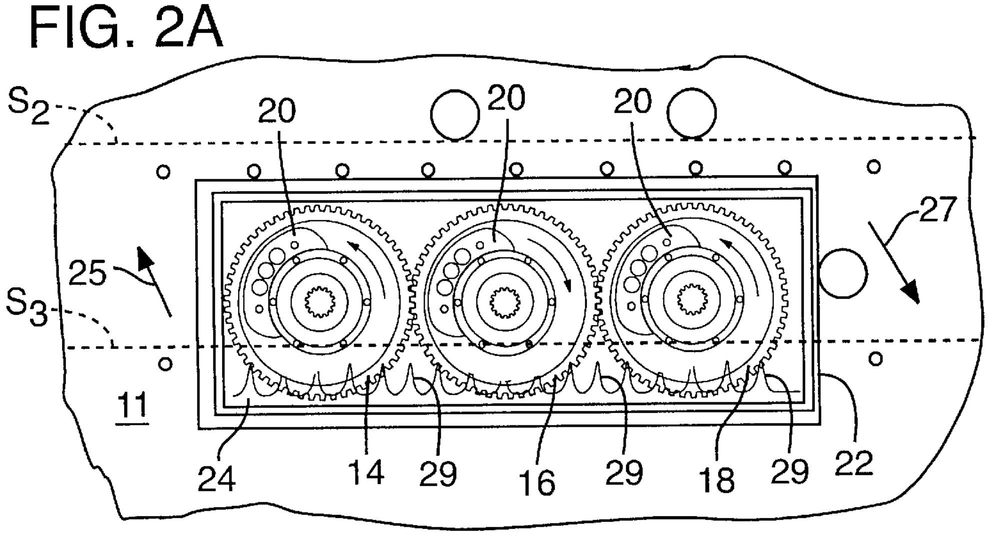

LUBRICATION SYSTEM FOR VIBRATING FLAT SCREENS

FIELD OF THE INVENTION

This invention relates to vibrating screens used, e.g., for separating rock into different sizes and more particularly to the manner of lubricating the gears utilized for producing the desired vibrations.

BACKGROUND OF THE INVENTION

Vibrating flat screens receive material to be screened (an admixture of differently sized rock) at one end of the top deck of screen or screen-cloth and the material is moved toward the opposite end by vibration. In the process, rocks of a size that fit through the screen openings are dropped through those openings and likely onto a second deck having somewhat smaller sized screen openings where the process is repeated. There may be a third screen deck and however many decks are used, the larger sized rock (larger than the screen-cloth openings) are forced off the end of each deck and collected (the bottom most deck will deposit its screened material, e.g., gravel, onto an underlying conveyor or chute to also be collected).

The vibration of the screen is angularly directed from the receiving end to the opposite end (collection end) and is achieved by mounting the assembly of screens on springs. Gears mounted to the screen assembly are provided with weights mounted off center. Due to centrifugal force, the circular motion of the weights will tend to lift up and then push down on the spring supports. As the action is very rapid, the screens are effectively vibrated. The angular direction of the vibrating motion is achieved by placing a weight on each of a plurality of gears with at least one gear being rotated in the opposite direction to the other or others. By arranging the weights on the respective gears so that they become aligned at, e.g., the 10:00 and 4:00 positions, the vibration will be directed angularly from the receiving end to the collecting end (right to left as illustrated in the drawings).

These gears become heated and it is necessary to maintain the heat below a specified temperature. To facilitate cooling, the gears are lubricated. This is accomplished by placing the gears in a closed box and partially filling the box with a low viscosity lubricant, e.g., oil, but only to a level just below the bottom of the gears. The box is vibrated with the screen assembly which produces oil spikes that project up onto the gears and more importantly into the path of the rotating weights mounted on the gears. The oil spikes are contacted by the weights and thrown or flung upwardly onto the entirety of the gears.

The above application of lubrication to the gears allows more rapid vibration. However, the upper limit of vibration (above which the maximum temperature is exceeded) is still below that which is sometimes desired. It is accordingly an objective of the present invention to modify the prior design and enable a higher rate of vibration (via higher rotation of the gears) without exceeding the temperature limit.

BRIEF DESCRIPTION OF THE INVENTION

The present invention is derived from an investigation of what effects temperature rise in the oil bath. It was surmised that the weight attached to the gears impact the oil spikes and the impact itself generates heat. The weights are typically segments of a thick ring of steel, each ring being cut into three segments and each segment comprising a weight to be attached to a gear. The ends of the segments are a flat face that is positioned radial to the gear axis. Thus, a flat face having the dimension of the weight (width and height, e.g., 3"×5") is rapidly rotated into the oil spikes and results in a hammer-like splattering of the oil that induces heating.

The invention eliminates this hammer-like impact with a configuration that engages the oil with a sweeping action. The weight more closely resembles a crescent shape which is beneficial in providing a leading face that is a curved edge rather than a flat face that impacts the oil. This leading edge wipes or sweeps through the oil spikes and carries and throws a portion of the oil as the weight is rotated around the gear axis. It is more accurately described as a sweeping or wiping and throwing action as differentiated from the impacting action of the prior system.

With the modifications to the configuration of the weights as described, tests have established that the gears can indeed be accelerated to higher rotative speeds, achieving the benefits of the accelerated vibration, but without exceeding the established temperature maximum and without losing the lubrication benefits.

A further benefit is achieved by producing the weights from multiple thin plates rather than a single thick plate. First, the crescent shape can be cut from a rectangular plate with the crescent shapes cut out of the plates in a nested relationship. Waste material is significantly reduced. Second, the several weight segments making up a weight can be varied in length and arranged in a shingled relation so that the weight has a compound curve as its leading face.

A further benefit of the invention as may be surmised is that the impact action of the prior weights produces a splattering action which causes the oil to settle into pockets between the weights. This is undesirable and significantly reduced with the present invention. The above benefits and others will become apparent to those skilled in the art and will be more fully appreciated upon reference to the following detailed description having reference to the accompanying drawings.

BRIEF DESCRIPTION OF THE DRAWINGS

FIG. 1 is a top or plan view of a flat vibrating screen assembly as used to screen rock into different sizes as contemplated for the present invention;

FIG. 2 is a side view of the flat screen as illustrated in FIG. 1 and further illustrating the weighted gears in operative relation;

FIG. 2A is an enlarged partial view of the weighted gears and gear box as illustrated in FIG. 2;

DESCRIPTION OF THE PREFERRED EMBODIMENT

Figure 3:
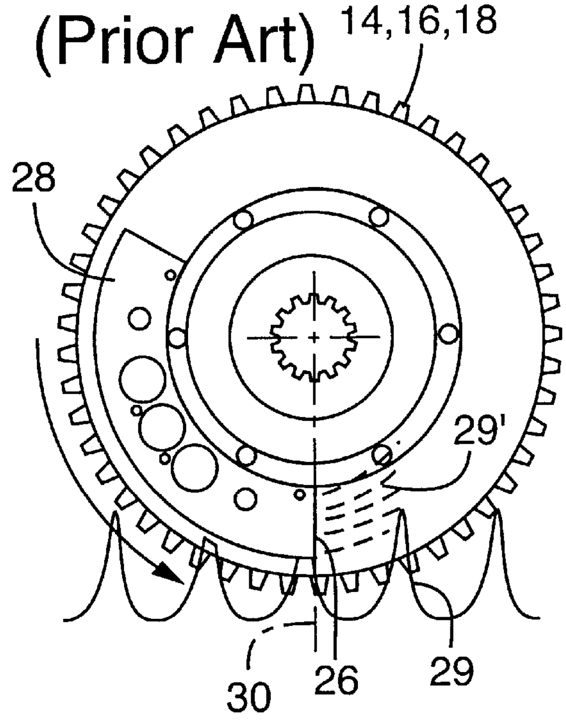
FIG. 3 (Prior Art)
FIGS. 3 and 4 are side and end views of a weighted gear in accordance with the prior art.

With reference to FIGS. 1 and 2, FIG. 1 is a plan view and FIG. 2 is a side view of a vibrating screen incorporating the present invention. The screen assembly 10 is shown to have three levels of screening members referred to as S1, S2 and S3. The screens are mounted to a housing comprised of opposing side walls 11 and opposing end walls 13 (sometimes referred to as a basket). The housing is mounted on springs 12 as shown in FIG. 2.

Mounted to one of the opposing side walls 11 is a gear set including gears 14, 16 and 18, the gears being in meshed relation. Opposing each of the gears on the opposite wall 11 is a wheel 15. Shafts 21 extend through the assembly 10 and interconnect each of the gears with its opposing wheel 15. A motor 19 drives gear 14, e.g., via a drive belt and shiv arrangement indicated at 23, in a manner well known to the art. Gear 14 drives gear 16 which drives gear 18 and though connecting shafts 21, similarly drives wheels 15.

Mounted to each gear of gear sets 14, 16 and 18 and opposing wheels 15 are weights 20 which will be more specifically described hereafter. The gear wheels and attached weights are mounted on the outer sides of wall 11 as shown and a closed box 22 on the outer side of each wall 11 surrounds the gears or wheels and their weights 20. To provide lubrication of the gears and wheels, a pool of low viscosity oil 24 is deposited in the box 22 at a level just below the bottom of the gears and wheels (see FIG. 2A).

As indicated by the directional arrows, the center gear 16 rotate opposite the side gears 18, 20. The weights 20 are strategically arranged on the gears (14, 16, 18) so that they all line up, e.g., at a 10:00 o'clock position as shown in FIG. 2A. They will line up again at the 4:00 o'clock position. In between, the center and side gears are out of sync as illustrated in FIG. 2. It will be appreciated that the only time that the gears are all in alignment is at the 10:00 and 4:00 positions. At these two positions, the centrifugal force generated by the combined weight is directed upwardly and to the left as indicated by arrows 25 (with the weight in the 10:00 position), and downwardly and to the right as indicated by arrows 27 (with the weights in the 4:00 position). At all other positions, the weights of gears 16 partially cancel the centrifugal force of weights 14 and 18 with a net effect that the entire assembly 10 is vibrated rapidly in the direction of arrows 25, 27. The above similarly applies to the opposing wheels 15. Rocks deposited on the right end of screen level $S_1$ (and at positions intermediate the ends for screen levels S2 and S3) are accordingly vibrated toward the opposite or left end of the screen as viewed in the figures.

Screen $S_1$ is designed to screen out the largest rock size and the screen openings of Screen S1 are sized to prevent passage of said largest rock size. The rock sizes smaller than the screen openings of S1 fall through the screen openings and onto screen S2. The larger rocks are vibrated off the left end and onto a conveyor (not shown) to be collected for further processing.

This process is repeated for screens S2 and S3 with the smaller sized rock, e.g., gravel, falling through the screen S3 and onto, e.g., a conveyor positioned under the screens to be conveyed for collection and subsequent processing.

Figure 4:
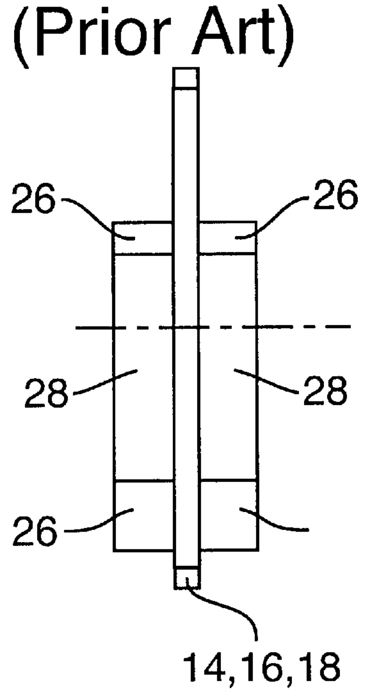
FIG. 4 (Prior Art)

Returning to FIG. 2A, it will be appreciated that the box 22 secured to the wall 11 is also vibrated as is the oil 24 inside the box. The vibrated oil projects spikes of oil upwardly as indicated at 29. These spikes of oil are projected into the path of the rotating weights 20 and the oil is engaged by the weights and thrown throughout the interior of box 24 resulting in the gears being coated with the oil to achieve the desired lubrication. Reference is now made to FIGS. 3 and 4 which illustrate a weight 28 secured to a gear (14, 16 or 18) as incorporated in prior art screen assemblies. As illustrated, the weight 28 is a segment of a ring. Typically such a weight is a third of a ring and thus three weights are produced from a single ring and the three weights are equal in size and configuration. Most notable is the flat end faces 26 which are substantially perpendicular to the direction of rotation (as indicated by radial dash line 30). An oil spike 29 is illustrated having been impacted by the face 26 and the result is portrayed at 29' whereby the oil is splattered. The rapid and repeated impacting of the oil produces heat and elevates the temperature of the oil which is intended to coat the gears and reduce the frictionally generated heat that results from the rapid meshing of the gear teeth.

Figure 5:
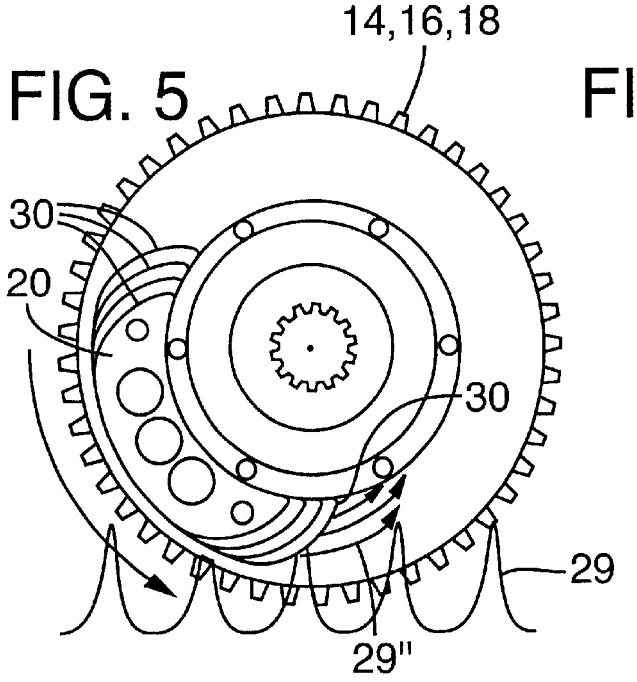
FIGS. 5 and 6 are front and side views of a weighted gear in accordance with the present invention.
Figure 6:
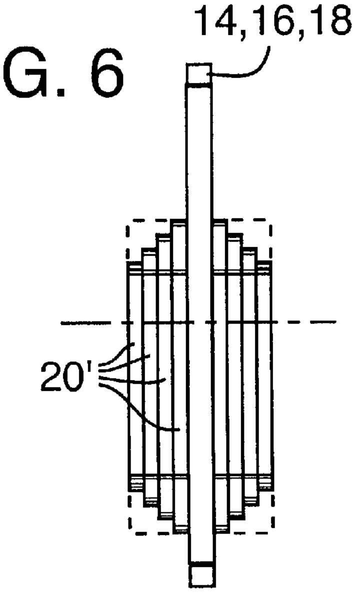
Figure 8:
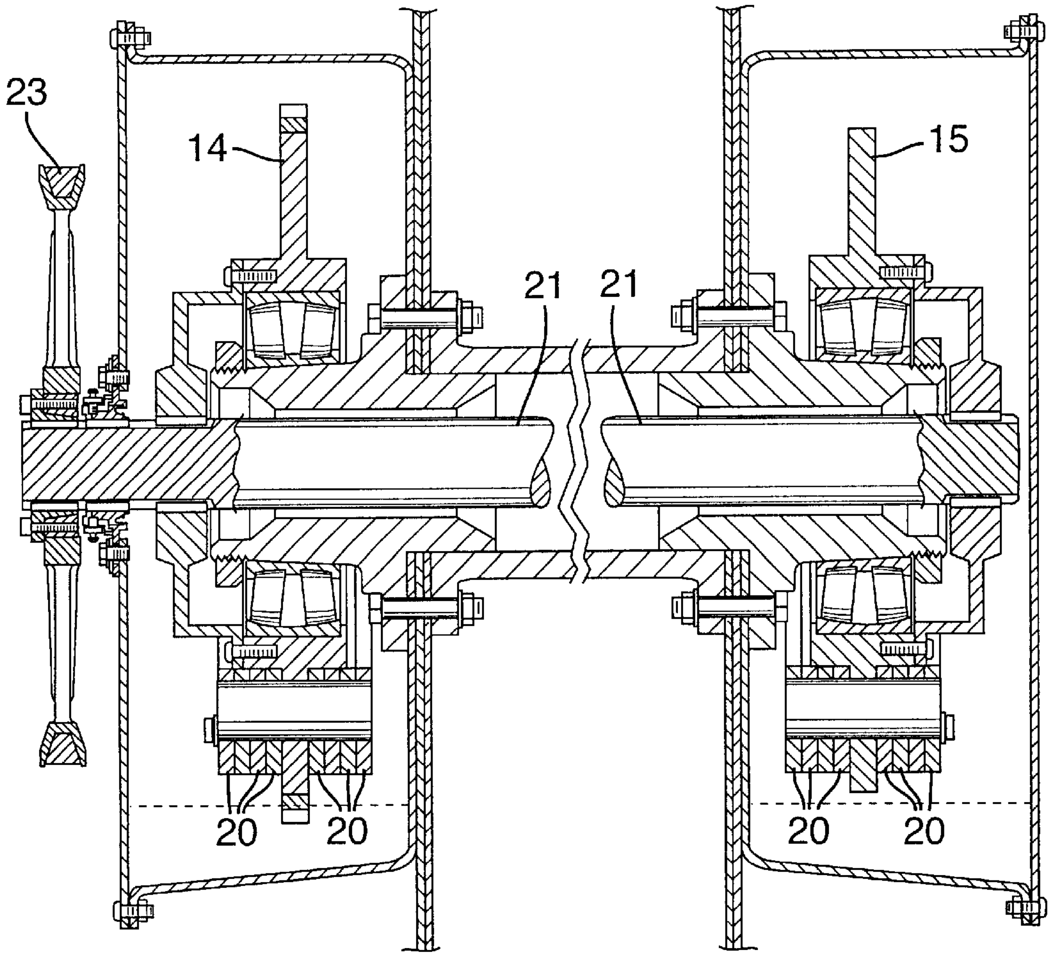
FIG. 8 is a cross section of the drive mechanism for the gears, in part.

FIGS. 5 and 6 illustrate the gear and weight action of the present invention. The weight 20 as shown in FIG. 6 is made up of weight segments 20'. The weight segments are each configured to have a rearwardly angled and curved leading face 30 in the radial direction and each segment is rearwardly stepped to provide a secondary curve in the axial direction (i.e., a compound curve). Alternatively, similarly sized and configured segments may be simply positioned in overlying relation to present a lateral leading edge as indicated in dash lines in FIG. 6.)

The action of engaging the oil spikes 29 by the weight 20 is portrayed as a swiping action with the oil being progressively engaged whereby the oil is effectively wiped from the spike and rapidly carried or flung upwardly by the rotating engagement of the weights 20 (indicated by arrows 29". The heat inducing hammer-like impact generated by the weights of the prior art is significantly reduced thereby producing the benefit of cooler oil bathing the gears to more effectively control heating of the gears.

Figure 7:
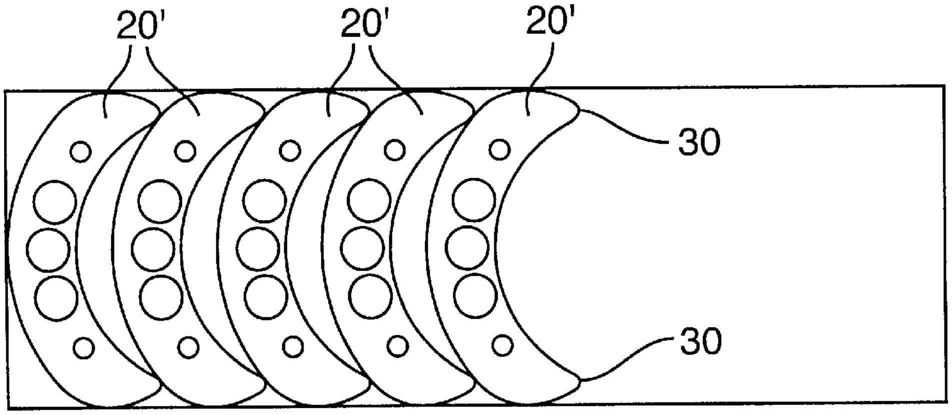
FIG. 7 is an illustration of a rectangular steel plate from which the weight segments are generated.

In those situations where elevated vibration is desirable, the improved configuration of the weights enables a significantly increased rate of vibration (rate of gear rotation) before reaching the maximum temperature. Whereas the prior art segments were considered most efficiently produced from a solid uniform ring, e.g., 3" thick, the crescent shape segments are more efficiently produced from rectangular plates of steel, e.g., ⅝" thick. The crescent shape segments can thereby be cut from the plates, e.g., by laser welding having nested crescent like shapes, the process being illustrated in FIG. 7.

The above disclosure is representative only of the preferred embodiment of the invention and those skilled in the art will conceive of numerous variations and modifications without departing from the intended scope of the invention which is defined in the accompanying claims. It is specifically intended that these claims are not means plus function claims of 35 USC §112, Par. 6.

The invention claimed is:

1. A vibrating screen assembly having opposed ends and sides comprising:

a housing including opposed end walls and side walls, each of said walls having an inner side and an outer side, at least one screen deck mounted to the housing and extending from side wall to side wall and end wall to end wall at the inner sides of said walls;

a spring support supporting the housing;

a gear set including at least a pair of intermeshed gears, said gear set mounted at the outer side of one of the opposing side walls and a drive motor for rotatively driving the gears whereby the gears are commonly driven and adjoining intermeshed gears have oppositely directed rotation about an axis;

off center weights mounted to each gear cooperatively arranged to align the weights in the rotative cycle at an angle to generate angular vibration of the housing and urge end-to-end movement of material placed on an end of the screen assembly, and an enclosure surrounding the gears at said side wall and secured to the housing and a low viscosity lubricant in the enclosure defining a surface of lubricant whereby upon vibration of the housing, lubricant spikes formed on the surface extend upwardly into the path of the rotating off center weights;

said weights having inner and outer sides relative to the axis of rotation and a leading face that is rearwardly angled in the radial direction from the inner side to the outer side and that is rearwardly curved, whereby the leading face angularly and progressively wipes through the lubricant spikes and in the process receives and directs lubricant upwardly onto the gears for lubrication thereof.

2. A vibrating screen as defined in claim 1 wherein the weights are crescent shaped.

3. A vibrating screen as defined in claim 1 wherein the leading face is further angled rearwardly and laterally from center to side to form a pointed leading face.

4. A vibrating screen as defined in claim 1 wherein the weights have a defined thickness comprised of multiple weight segments.

* * * * *